Jan. 7, 1964  R. PICKARD  3,116,892
ELECTRIC FISHING REEL

Filed Aug. 15, 1961  3 Sheets-Sheet 1

INVENTOR.
ROD PICKARD
BY
Salvatore J. Militano
attorney

Jan. 7, 1964     R. PICKARD     3,116,892
ELECTRIC FISHING REEL

Filed Aug. 15, 1961     3 Sheets-Sheet 2

INVENTOR.
ROD PICKARD
BY
*Salvatore G. Militana*
*attorney*

Jan. 7, 1964 R. PICKARD 3,116,892
ELECTRIC FISHING REEL
Filed Aug. 15, 1961 3 Sheets-Sheet 3

INVENTOR.
ROD PICKARD
BY
Salvatore G. Militana,
Attorney

United States Patent Office 3,116,892
Patented Jan. 7, 1964

3,116,892
ELECTRIC FISHING REEL
Rod Pickard, 615 SW. 2nd Ave., Miami, Fla.
Filed Aug. 15, 1961, Ser. No. 131,533
4 Claims. (Cl. 242—84.1)

This invention relates to fishing equipment and is more particularly directed to an electrically powered fishing reel.

A principal object of the present invention is to provide a fishing reel with a D.C. motor coaxially mounted at the hub of the reel for electrically operating the fishing reel.

Another object of the present invention is to provide a fishing reel with means for shifting from manual to power operation of the fishing reel thereby making it possible to fish for extremely large fish with a conventional fishing rod.

Another object of the present invention is to provide a fishing reel with electric power for operating the reel with a control for adjusting the speed of the reel to the desired rate.

A further object of the present invention is to provide a fishing reel with a D.C. motor which may be reversed in direction thereby permitting the powered winding or unwinding of the fishing reel.

A still further object of the present invention is to provide a fishing reel with a power source which is simple in construction and operation, relatively inexpensive in cost and most effective in operation.

With these and other objects in view, the invention will be best understood from a consideration of the following detailed description taken in connection with the accompanying drawings forming a part of this specification, with the understanding, however, that the invention is not confined to any strict conformity with the showing of the drawings but may be changed or modified so long as such changes or modifications mark no material departure from the salient features of the invention as expressed in the appended claims.

Figure 3:
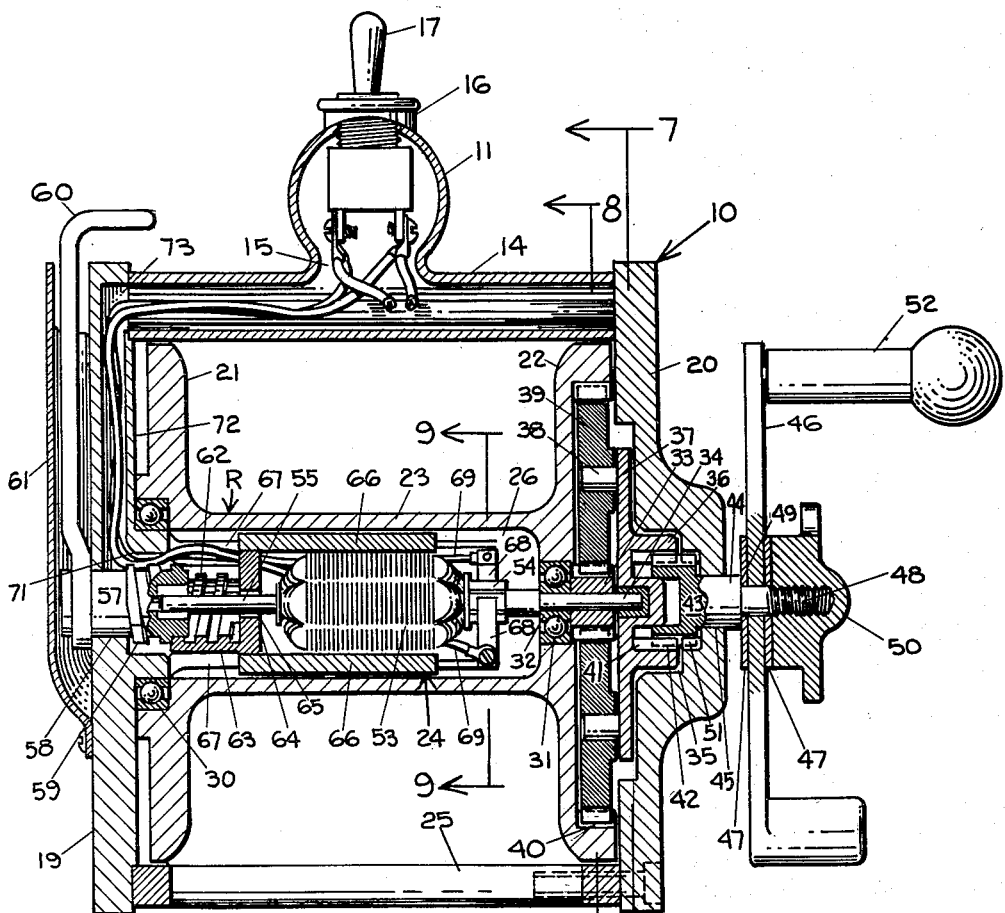
FIGURE 3 is an enlarged cross sectional view of my fishing reel taken along the line 3—3 of FIGURE 2.

Referring to the drawings wherein like numerals are used to designate similar parts throughout the several views, the numeral 10 refers generally to my reel fastened to a tubular support 11 at one end of which is inserted a fishing rod 12 and at the other end there extends a grip or handle 13. The reel 10 is secured to the tubular support 11 by a bracket 14 which is soldered or otherwise secured to the tubular support 11 at an opening 15 formed to permit electric wires to extend therethrough to a switch 16 as best shown by FIGURE 3. The switch 16 is secured in the tubular support 11 having a toggle pin 17 extending beyond the support 11 in order to be readily accessible to a person in the act of fishing with the fishing rod 12. The ends of the bracket 14 are secured by screws 18 to spaced apart end support plates 19, 20 which are secured together at their periphery by spacer members 25.

Mounted for rotational movement between the end plates 19 is a spool R having flanges 21, 22 and a hub portion 23 provided with a centrally disposed chamber 26 in which is mounted a D.C. motor 24. The flange 21 is journalled to the end support plate 19 by a ball bearing race assembly 30 mounted therebetween while the flange 22 of the spool R is rotatably supported by a ball bearing race assembly 31 secured between the hub 23 and a hub 32 of a sun gear 33 splined to an end of a shaft 34.

The end support plate 20 is provided with a coaxially hollowed-out portion forming a chamber 35 for receiving the hub 36 of a planetary spider or cage 37. The spider 37 has three arms on which are mounted pins 38 for receiving rotatably thereon planetary gears 39. The sun gear 33 is in mesh engagement with the planetary gears 39 at their inner portion while the outer portions of the planetary gears 39 are in mesh engagement with an internal ring gear 40 secured to the spool flange 22.

Figure 4:
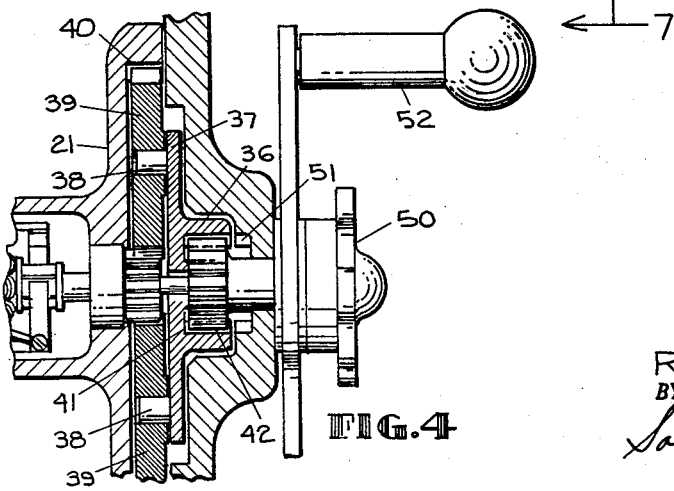
FIGURE 4 is a fragmentary view of the reel showing the handle positioned for manual reeling.
Figure 8:
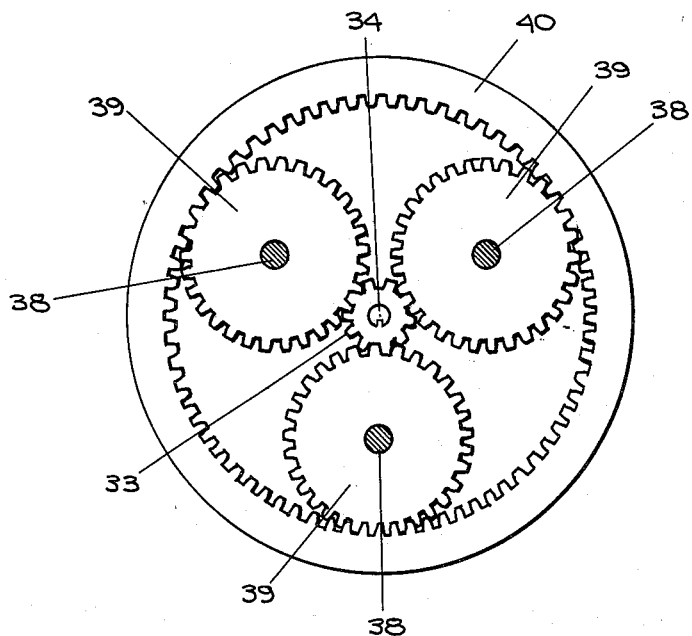
FIGURE 8 is a cross sectional view taken along the line 8—8 of FIGURE 3.
Figure 7:
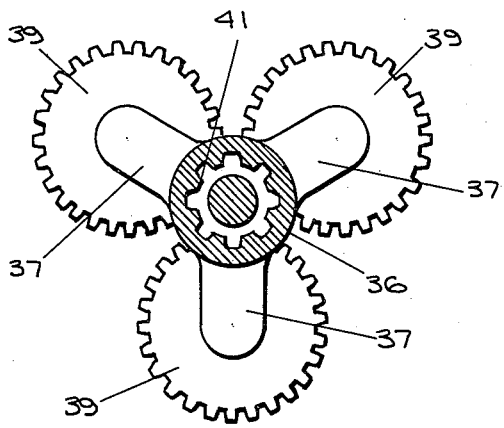
FIGURE 7 is a cross sectional view taken along the line 7—7 of FIGURE 3.
Figure 9:
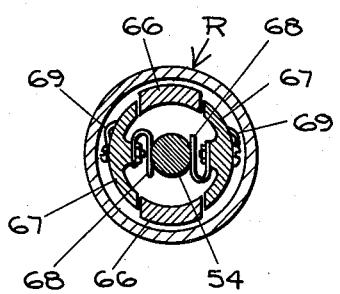
FIGURE 9 is a cross sectional view taken along the line 9—9 of FIGURE 3.

In order to permit the manual operation of the reel 10, the hub 36 is provided with internal teeth 41 which are in constant mesh engagement with teeth 42 formed on a hub 43 which is secured to the inner end of a stub shaft 44. The stub shaft 44 extends through a bore 45 in the end plate 20 and has mounted thereon an operating handle arm 46 positioned between a pair of brake plates 47 likewise mounted on a free end 48 of the stub shaft 44. The shaft 44 is of larger diameter than that of the end portion 48 thereby forming a shoulder 49 against which the inner brake plate 47 bears so that by adjusting a tension knob 50 on the threaded end portion 48 of shaft 44 the desired amount of drag on the spool R may be placed thereon. The teeth 42 of the hub 43 are in mesh engagement with teeth 51 formed on the inner surface of the end support plate 20 in the chamber 35. When it is desired to operate the fishing reel 10 manually by use of the handle 52, the shaft 44 is made to slide inwardly by an inwardly directed force applied on the tension knob 50. This causes the teeth 42 to slide inwardly of the hub 36 and become disengaged from the teeth 51 of the end plate 20, assuming the position shown by FIGURE 4. Now, when the operating arm 46 is rotated, the shaft 44 will rotate causing the planetary cage or spider 37 to revolve. The sun gear 33 will remain fixed as is explained in detail hereinafter, while the planetary gears 39 will revolve on the pins 38 as well as rotate along with the spider 37 about the shaft 34 as the axis of rotation causing the spool R to rotate.

Means are provided for operating the spool R by the electric motor 24 mounted coaxially within the hub 23, consisting of an armature 53 and a commutator 54 mounted to rotate with the motor rotor or shaft 34 extending in the direction of the end plate 20 and shaft 55 extending in the direction of the end plate 19. The shaft 55 is received by a coaxial bore formed in a stub shaft or screw 57 rotatably mounted in a bore 58 in the end plate 19. Acme threads 59 are mounted on the screw 57 with the first thread bearing against the inner surface of end plate 19 to prevent an outward axial movement of the rotatable screw 57. A lever 60 mounted on the outside of the end plate 19 has its lower end secured to the screw 57 in contact relation with the outer surface of the end plate 19 whereby actuation of the lever 60 will permit rotation of the screw 57 without any axial movement thereof. A guard 61 which is mounted over the lever 60 and secured to the outside surface of the end plate 19 limits the movement of the lever 60 and prevents the inadvertent actuation of the lever 60.

The threads 59 of the screw 57 are received by companion threads 62 formed within a hollow cylindrical member 63 which is secured to a magnet support member 64 having a bore 65 through which the shaft 55 extends. A pair of permanent magnets 66 positioned in close proximity to the top and bottom of the armature 53 are fastened at one end to the magnet support member 64. To prevent the magnets 66, magnet support 64, and cylinder 63 from rotating when the lever 60 is actuated to cause the screw thread 59 to rotate and be received by the companion threads 62, there is provided a pair of magnet guide members 67 positioned on each side of the armature 53 in spaced relation thereto with one end secured to the inner surface of the end plate 19. The magnets 66 are positioned between the magnet guide members 67 and consequently cannot rotate about the armature 53 but instead will move axially when the lever 60 is actuated.

Figure 1:
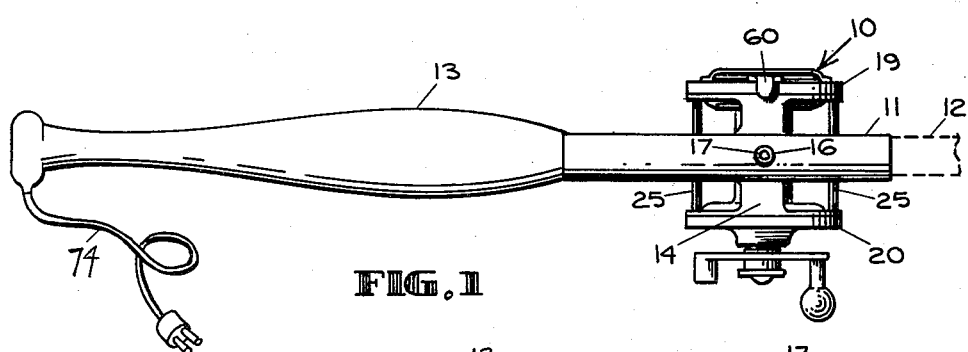
FIGURE 1 is a top plan view of the lower portion of a fishing rod on which is mounted a fishing reel constructed in accordance with my invention.
Figure 2:
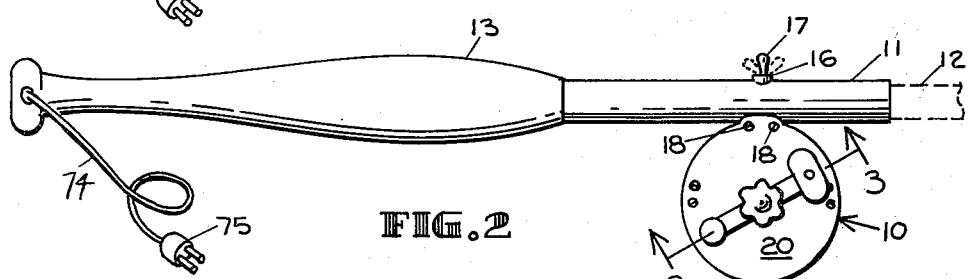
FIGURE 2 is a side view thereof.
Figure 5:
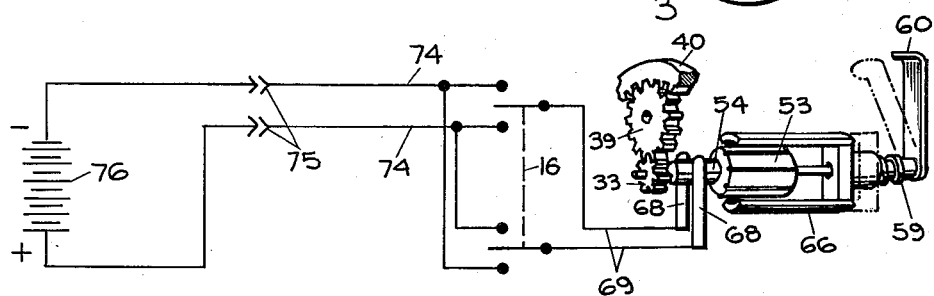
FIGURE 5 is a fragmentary perspective view of an electric motor and a schematic wiring diagram connecting the motor to a power source.
Figure 6:
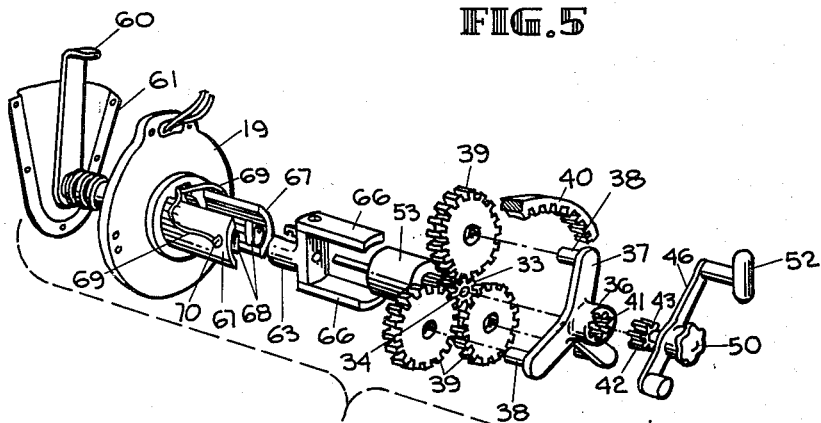
FIGURE 6 is an exploded view of the reel operating mechanism with the reel shown removed.

On the inner surface of each of the magnet guide members 67 is a brush 68 secured thereto in a conventional manner so as to be insulated therefrom. Electric wires 69 connected to the brushes 68 pass through bores 70 in the guide members 67 and along the outside surface thereof. See FIGURE 6. The wires 69 leave the chamber 26 by an opening 71 in the end plate 19 and pass through a radially disposed passageway 72, leaving the end plate via an opening 73 and extending to the switch 16 where they are connected as shown by FIGURES 3 and 5. Wires 74 which are connected to the other side of the double pole reversing switch 16 extend along the tubular member 11 and grip 13 toward the lower end thereof and extending outwardly thereof. At the end of the wires 74 there is a plug 75 for connecting to a source of energy such as a battery 76. When the toggle pin 17 of the switch 16 is in its mid-position, the D.C. motor 24 will not be energized. By flipping the toggle pin 17 to one side, the negative side of the battery 76 will be connected to one of the brushes 68, the positive side to the other brush 68 and the motor 24 will rotate in one direction causing the spool R to rotate as is explained in detail hereinafter. When it is desired to reverse the direction of rotation of the spool R the toggle pin 17 of the switch 16 is then flipped to the opposite side. In this instance the negative side of the battery 76 will now be connected to the brush 68 which was previously connected to the positive side of the battery 76.

In the normal operation by battery power of the fishing reel 10, the toggle pin 17 is actuated to the proper side of the switch 16 that results in the desired rotational movement of the spool R. Previously thereto, the operating arm 46 had been pulled outwardly to cause the shaft 44 to slide outwardly and the teeth 42 to mesh with the teeth 51 whereby the end plate 20 and the planetary cage or spider 37 become fixed together. As the D.C. motor becomes energized, the armature 53 will rotate causing the shaft 34 and the splined sun gear 33 to rotate. The planetary gears 39 which are in mesh engagement with the sun gear 33 will now rotate about the pins 38 which are themselves not in motion since the spider 37 is temporarily secured to the end plate 20. The rotating planetary gears 39 will effect a rotation of the ring gear 40 and the spool R to which the ring gear 40 is affixed.

It is readily noted that in accordance with my invention, the reel 10 may be powered or manually operated as desired. If manual operation is to be effected, the switch 17 is maintained in its neutral position and a direct force is applied on the tension knob 48 to cause the shaft 44, hub 43 and teeth 42 to slide inwardly until the teeth 42 become disengaged from the teeth 51. Now the handle 52 may be actuated in either direction to rotate the spool R as explained hereinbefore and wind or unwind fishing line from the spool R. The amount of drag may be varied by adjustment of the tension knob 50. The magnetic force of the magnets 66 on the armature 53 also acts as a drag, preventing the rotation of the sun gear 33 during the manual rewinding of the fishing line on the spool R. A ten pound pull on the fishing line was required to cause the spool R to rotate with relation to the armature 53.

If it is desired to use power for turning the spool R, the tension knob 50 is pulled outwardly to cause the teeth 42 to engage and mesh with the teeth 51, thereby locking the planetary system against rotation. The switch 17 is actuated and the D.C. motor 24 becomes energized by virtue of the electricity flowing to the brushes 68. The speed at which the armature 53 and the spool R rotate is determined by the position of the magnetic bars 66 with relation to the armature 53. As shown by FIGURE 3, the magnetic bars 66 are in their extreme position to the right which position is the optimum speed producing position. By rotating the lever 60 clockwise as viewed by FIGURE 6, the screw 59 will rotate and draw the cylinder 63 toward the end plate 19 carrying the magnetic bars 66. A shifting of the stator or magnetic bars 66 to the left away from its position over the armature 53 so that the magnetic bars 66 do not extend along the full length of the armature 53, will effect a reduction of rotational speed of the armature 53 proportional to the distance moved. The armature 53 when energized also operates as a drag in much the same manner as the brake plates 47 when the reel 10 is operated manually. If the fish being pulled in exerts a greater force than the rotational power exerted by the motor 24, the spool R will rotate to unwind fishing line from the spool R until the power of the motor 24 will overcome the pull exerted by the fish. Then, the armature 53 and the spool R will rotate to take in the fishing line.

To reverse the rotational movement of the spool R all that need be done is actuate the switch pin 17 to the opposite direction. The polarity of the electrical energy at the brushes 68, 68 will be reversed and the armature 53 will rotate in the opposite direction as will the spool R.

What I claim as new and desire to secure by Letters Patent of the United States is:

1. A fishing reel comprising a pair of spaced apart end plates, a reel portion rotatably mounted between said end plates, said reel portion having an axially disposed chamber, said end plates having axially disposed bores, a stator mounted in said chamber, a hollow hub portion secured to said stator, internal thread means mounted in said hollow hub portion, a stub shaft extending through said bore of one of said end plates, means secured to said stub shaft for rotating said stub shaft and preventing the axial movement thereof, threaded means mounted on said stub shaft and received by said internal thread means for axial movement of said stator, guide means mounted on said one of said end plates and engaging said stator for preventing the rotational movement of said stator, armature means rotatably and coaxially mounted in said chamber, electrical means connecting said armature means, said armature means having a shaft, a sun gear splined to said shaft, a plurality of planetary gears in mesh engagement with said gun gear, an internal ring gear secured to said reel portion and in mesh engagement with said planetary gears, a planetary spider having a hub portion rotatably mounted on the other of said end plates, a plurality of pins mounted on said spider rotatably mounting said planetary gears, a second stub shaft rotatably mounted in said bore of said other of said end plates, an operating handle mounted on one end of said second stub shaft adjacent an outer surface of said other of said end plates, interengaging means mounted on said planetary spider, second stub shaft and said other of said end plates for connecting said spider and said last named end plate and means for disengaging said interengaging means and said other of said end plates whereby said reel portion may be selectively rotated manually by said operating handle or electrically upon energizing said armature.

2. The structure as recited by claim 1 wherein said interengaging means comprises internal slotted portions formed on said hub, said other of said end plates having slotted portions in close proximity to said internal slotted portions, teeth portions mounted on said second stub shaft in engagement with both of said slotted portions, said second stub shaft being slidable in the direction of said planetary spider whereby said teeth portions may become disengaged from said slotted portions of said other of said end plates to permit the manual rotation of said reel portion.

3. A fishing reel comprising a pair of spaced apart end plates, a reel portion rotatably mounted between said end plates, said reel portion having an axially disposed chamber, a stator mounted in said chamber, means connecting said stator to one of said end plates for axial and non-rotatable movement of said stator, armature means mounted rotatably and coaxially in said chamber in proximity of said stator, said armature means having a shaft, a sun gear secured to said shaft, a plurality of planetary gears in mesh engagement with said sun gear, an internal ring gear secured to said reel portion and in mesh engagement with said planetary gears, a planetary spider having a hub portion rotatably mounted on the other of said end plates, a plurality of pins mounted on said spider rotatably mounting said planetary gears, releasable means securing said spider and said other of said end plates, handle means operatively connected to said releasable means for selective manual operation of said reel portion, and electrical means connected to said armature whereby upon the energizing of said armature by said electrical means, said armature will effect the rotation of said reel portion.

4. The structure as recited by claim 3 and switch means connected to said electrical means for reversing the direction of rotation of said reel portion.

References Cited in the file of this patent

UNITED STATES PATENTS

| | | |
|---|---|---|
| 1,252,174 | Ramsay | Jan. 1, 1918 |
| 1,578,965 | Eck | Mar. 30, 1926 |
| 2,026,665 | Beasley | Jan. 7, 1936 |
| 2,470,507 | Luton et al. | May 17, 1949 |
| 2,587,308 | Gilette | Feb. 26, 1952 |
| 2,776,515 | Lynch | Jan. 8, 1957 |
| 2,866,291 | Duell | Dec. 30, 1958 |
| 3,017,134 | Duvall | Jan. 16, 1962 |